United States Patent [19]

Grace et al.

[11] 4,170,412
[45] Oct. 9, 1979

[54] MICROFILM ADAPTION UNIT FOR PHOTOCOPIER MACHINES

[76] Inventors: Archie R. Grace, 115 Avenue Rd., Clarence Gardens, South Australia; Robert J. Grace, 167 Churchill Rd., Prospect, South Australia, both of Australia

[21] Appl. No.: 894,388

[22] Filed: Apr. 7, 1978

[30] Foreign Application Priority Data

Apr. 20, 1977 [AU] Australia .............................. PC9821

[51] Int. Cl.² .......................................... G03G 15/00
[52] U.S. Cl. .......................................... 355/5; 355/8; 355/11
[58] Field of Search .................... 355/3 R, 5, 10, 8, 11

[56] References Cited

U.S. PATENT DOCUMENTS

| 3,424,525 | 1/1969 | Towers et al. ....................... 355/3 R |
| 3,547,533 | 12/1970 | Stokes et al. ........................ 355/3 R |
| 3,592,539 | 7/1971 | Haslam et al. ................... 355/3 R X |

*Primary Examiner*—R. L. Moses
*Attorney, Agent, or Firm*—J. Harold Nissen

[57] ABSTRACT

A microfilm or microfiche adaption unit for photocopier machines which fits to the photocopier machine over the transparent window platen thereof, and has a light source and lens and projection means to project an image through the window to produce a print in the photocopier machine. Direct viewing is also possible.

9 Claims, 3 Drawing Figures

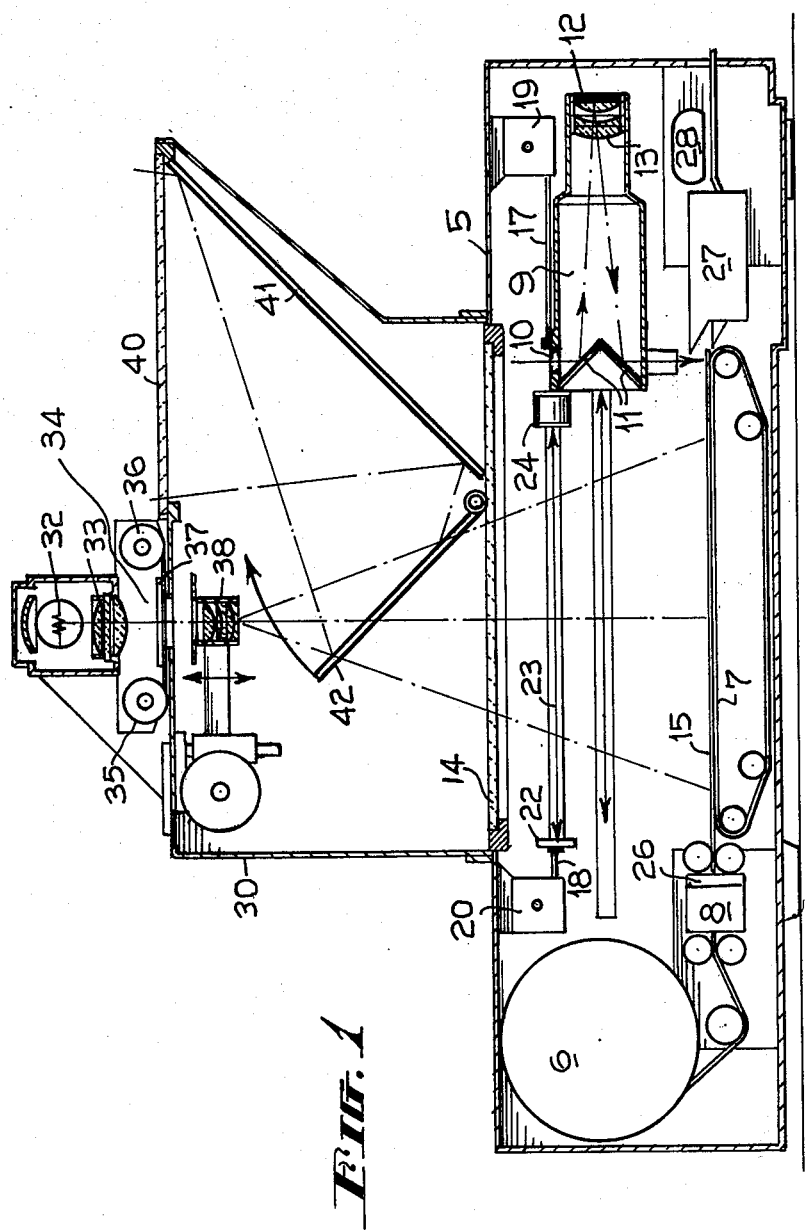

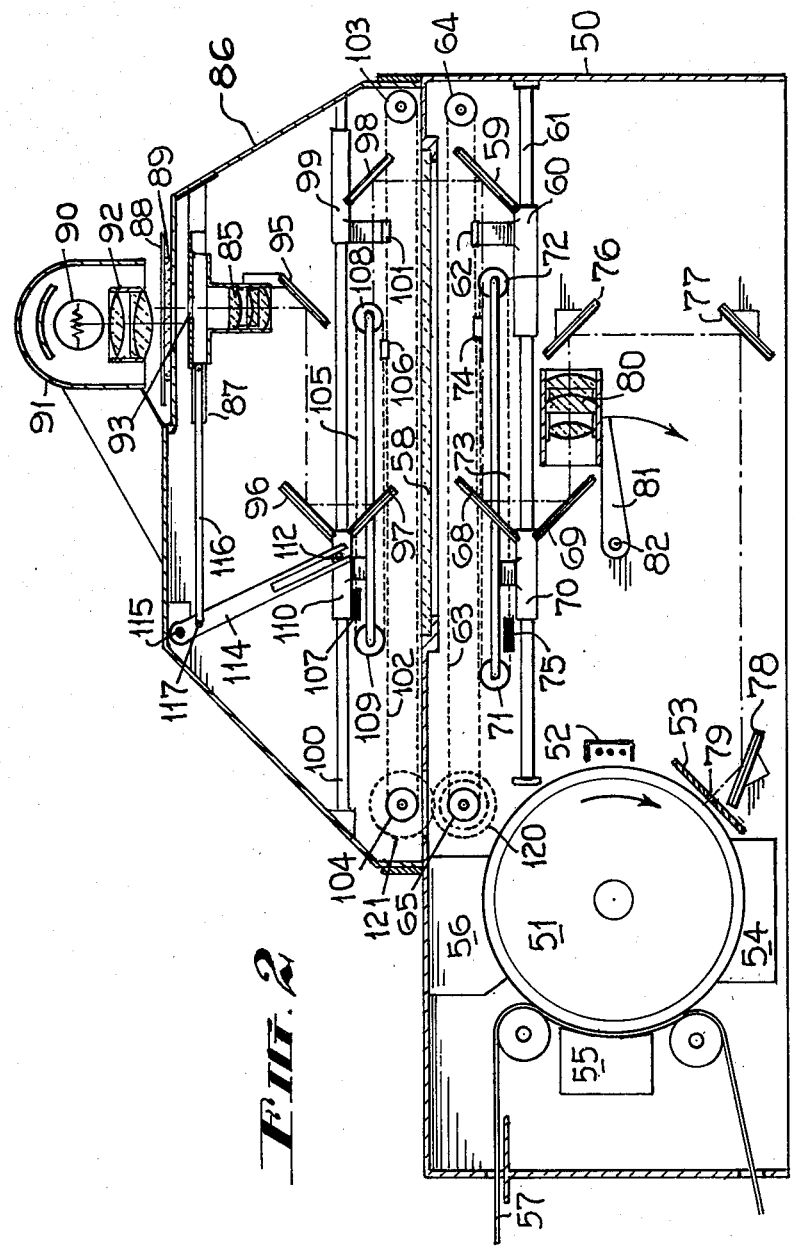

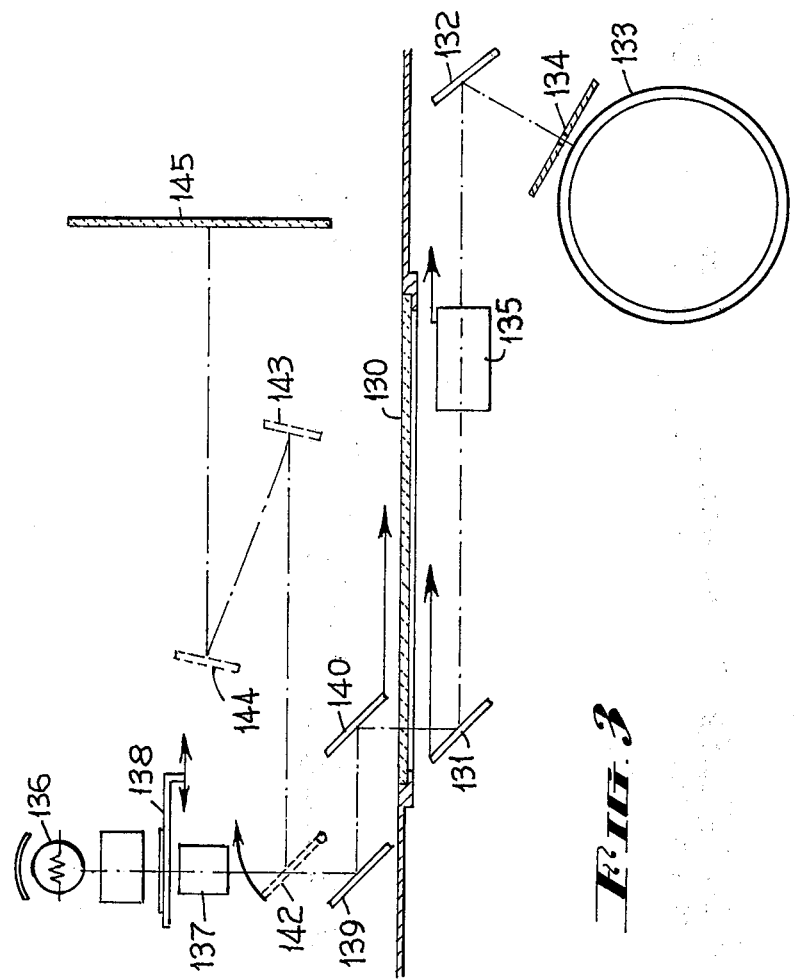

MICROFILM ADAPTION UNIT FOR PHOTOCOPIER MACHINES

This invention relates to a microfilm adaption "unit" for photocopier machines.

According to the methods of microfilm, microfiche and related data storage systems and the methods of xerography photocopying many forms of recording the data from such microfilm have been suggested in the past, the most common form currently in use is a microfilm reader/printer in which the section required is shown on the screen and then this is copied onto a paper within the reader/printer unit.

There is however a great demand for this copying process of microfilm or microfiche in offices and libraries, etc., where there is a photocopier or one is intended to be purchased for normal copying, but they do not or cannot justify a reader/printer. There is also a demand for enlarging facility in certain applications when making photocopies.

An object of this invention is to provide a copier which can reproduce microfilm or microfiche.

According to this invention these requirements are made possible in one "unit" which can be placed on any suitable photocopier machine and removed again without affecting the normal action or processes of the photocopier while the "unit" is not in use.

The result is the extension of a normal office copier to a copier of microfilm on a selected size or microfiche of any suitable size including the noram COM, NMA, or COSATI formats. The copy can be reproduced onto whatever size paper the copier can handle. Additionally, the "unit" can be supplied with an enlarging facility to enlarge from originals such as library cards of up to approximately 150 mm×100 mm and print-out through the copier with an image size similar to the paper size used or varied to suit any special requirement all of which systems are herein embraced in the expression "microfilm" and "microfiche".

The present invention is devised to produce an adaption or attachment that can be added readily and again removed to allow the copier to be used in the ordinary way. Problems which had to be overcome are due mainly to the slits can system used on most copiers, and also the drum movements during the exposure cycle.

The basic design is centred around a plain bond copier, but can be modified to suit most makes and models of copiers both "dry" and "wet" process in either black, monochrome or colour. The simple design is for copiers which have a stationary linear surface of electrostatic photoconductor after the charging cycle and during the exposure cycle, but a second version allows for moving linear or "drum" type photoconductor, and also for moving table copiers in which the photoconductive member moves longitudinally.

According to this invention a unit is provided which fits onto an existing copier and the unit varies in construction according to whether the copier has a stationary or a moving system onto which the image is projected, that is whether the scanner projects onto a fixed copy paper or onto a moving paper or onto a drum from which the image is subsequently transferred.

The invention comprises a projection apparatus which can handle either the microfiche or other master from which the copy is to be made and is so arranged that it can project this image onto the receiving member of the copy machine and in some cases is provided also with a mirror assembly so that the microfiche or other master can be read on a ground glass screen to give the facility both of a direct reading of the microfiche or the like or the projection of it into a copying machine to produce a copy.

Thus the invention comprises a microfilm or microfiche adaption unit for photocopier machines which comprises a housing adapted to engage the photocopier machine over the transparent window platen of the photocopier machine, a light source and a lense supported on the housing to project the light through the window, a carrier for a microfilm or microfiche on the housing between the light source and the lense to project an image through the window, and means within the photocopier machine to allow the image to be projected on to the photoconductive member of the photocopier machine and to subsequently develop the image so produced in the photocopier machine.

To enable the invention to be fully appreciated embodiments thereof will now be described with reference to the accompanying drawings in which:

FIG. 1 shows a copier of the type which utilizes a scanner which projects an image onto a stationary sensitized paper and onto which machine is placed the adaptor which projects an image from a microfiche or the like through the glass bed which is the normal support for the matter being copied, FIG. 2 is a similar view but shows a system which is used when the scanner operates on a sensitized drum and which therefore projects a moving image through a slit, and FIG. 3 is a schematic view showing a further system in which the photoconductor is disposed on a rotating drum and a simple moving scanner mirror and moving lense is used on the photocopier.

Describing first the embodiment shown in FIG. 1, the copier comprises a housing 5 in which is a paper supply reel 6 which feeds paper onto a transport belt 7 which forms the support for the paper during exposure, a guillotine 8 being used to sever the paper after a sheet has been projected onto the transport bed 7, the exposure being made by means of a travelling member 9 which carries a slit 10 and a pair of mirrors 11 which project the image from the slit 10 to a mirror 12 through a lens system 13, the travelling member 9 moving across the transport bed 7 and receiving an image from a master placed onto a transparent platen 14 which defines a window to scan an image from the master through the slit 10 and the mirrors 11 and the mirror 12 and lens system 13 onto the sheet of paper 15 resting on the transport bed 7.

In normal operations such a machine has a pair of blinds 17 and 18 carried in roller boxes 19 and 20, the blind 17 being attached to the travelling member 9 and the blind 18 similarly attached to the member 9 to cut off all light from the paper 15 placed on the transport bed 7 excepting that which passes through the slit 10 and is transmitted by means of the mirrors 11 and 13 and lens 12 assembly.

The basic copier is modified according to the invention by having on the ends of the blind 18 a control plate 22 guided on rods or in guides 23 and the control plate 22 is associated with a magnet 24 which is fixed to the travelling member 9 so that the control plate 22 can either be held by the magnet 24 to cause the blind 18 to move with the travelling member 9 or it can be left behind in the position shown in the drawings when the magnet 24 is de-energized, the purpose of this being to leave the paper 15 on the transport bed 7 in a position where it can be exposed by light entering through the transparent platen 14.

A corona device 26 is positioned to charge the paper 15 as it is fed on to the transport belt 7.

In normal operation when the device is used simply as a copying machine the travelling member 9 moves across the paper 15, moving both blinds 17 and 18 with it, and as the travelling member 9 returns the image is projected through the slit 10 through the mirror 11 and 13 and the lense 12 onto the photoconductive surface of the paper 15. When the latent electrostatic image is so completed the paper is passed by the transport means 7 into the developer station 27 and in the case of a dry developer, passes the fuser station 28 where the image is fixed to the paper.

When however the machine is to be used in connection with a projected image from a microfilm or a microfiche or other source, a film being shown, the housing 30 is placed in position over the housing 5 so that it covers the transparent platen 14 and seals off any external light from it.

The housing carries on it a light source 32 and a condensor lens system 33 and has a transport member 34 arranged to pass the film from the spool 35 to the spool 36, the film passing between guide plates 37 and the image of the film being projected by the lens 38 through the window formed by the transparent platen 14 and it would normally be intercepted by the blind 18, but when in use in this way the travelling member 9 is moved across the paper 15 on the transparent bed 7 by the travelling member 9 until the control plate 22 attached to the blind 18 reaches the position shown in the illustration whereupon the magnet 24 is de-energised and the travelling member 9 is moved back leaving the blind 18 behind.

A light image can now be projected through the lens 38 onto the paper 15 to expose the paper and the so exposed paper can then be passed through the developer station 28 and the fuser 29 to discharge from the machine. The operation of the photocopier is thus normal excepting for the operation of the blind 18.

To enable the device to be used as a viewer also it is provided with a ground glass or similar screen 40 and a pair of mirrors, one being a mirror 41 which is fixed in position, the other being a mirror 42 which is movable so that it can be placed into the position shown in the illustration where the image from the lens 38 is reflected from the mirror 42 onto the mirror 41 and is then produced on the screen 40. However when it is desired to print the image, the mirror 42 is swung back out of the path of the light rays from the lens 38 and the above referred to printing of the image can be carried out.

In this way a normal photocopying device can be retained for its ordinary use but by modifying the blind mechanism and providing an attachment which contains the viewing device the machine can also make copies from the viewer on the normal developer and exposure system of the copying machine. The internal light system of the copy machine, not shown, is switched off when using the light source 32 during film or microfiche copying.

Referring not to the form shown in FIG. 2 which relates to a machine of the type which records on a travelling photoconductor, in this case on the drum from which transfer takes place to paper.

In this the original machine consists of a housing 50 which has within it the photoconductive drum 51 onto which an image is projected and which has associated with it a charging station 52, an exposure station 53, a developer station 54, a transfer station 55 and a cleaning station 56, the belt or web to which transfer is taking place being designated 57.

In the copying machine the material to be copied is carried on a glass platen 58 which defines the window and is carried on the housing 50 and beneath this is a travelling scanning mirror 59 which scans the material placed on the platen 58, the scanning mirror being shown fixed to a moving support 60 on a guide 61 and moved by being connected at 62 to a chain 63 passing around sprockets 64 and 65 and driven by any suitable means.

Associated with the travelling scanning mirror 59 are a pair of secondary mirrors 68 and 69 which are mounted on a carrier 70 also movable on the guide 61, the carrier 70 supporting a pair of sprockets 71 and 72 on it engaging a chain 73 which is fixed to the chain 63 at the point 74 and is fixed to the housing 50 at the point 75 so that while the chain 73 is driven by the chain 63, it is fixed in place by the connection 75 to the housing 50.

Opposite the mirror 69 is a mirror 76 which is also fixed to the housing 50 and a second mirror 77 also fixed to the housing 50 which projects the image to a mirror 78 adjacent to the drum 51, a slit 79 allowing the image to be projected onto the drum as the drum rotates.

The projection lens is shown at 80 and this is mounted on an arm 81 pivoted to the housing 50 at 82 so that the projection lens can be swung out of position when the external lens 85 used for projecting a microfiche or the like is in use.

The device which allows the added projection comprises a housing 86 which supports the lens 85 on a guide 87 so that it has a small amount of lateral movement to allow scanning of a microfiche or other data-containing member 88, this resting on a transparent support 89 or being otherwise supported.

A light source 90 is positioned in a housing 91 also attached to the housing 86, a condenser lens 92 being shown, but instead of fixing this light source as shown, depending on the length of the area scanned, the housing 91 can be moved with the guide member 87 to maintain the lens and light source on the axis of the lens 85.

A slit 93 may or may not be used as the final image slit 79 normally provides the width of image which is being projected on to the drum 51.

As in the case of the mirror mechanism within the housing 50, compensation is again required to allow for difference of length of the projection path as the mirror 59 moves from one side of the glass platen 58 to the other during a scan and an arrangement similar to that shown for the projection lens 80 has in this case being shown to provide the necessary length compensation.

The mirror 95 is supported on the lens mount 85 and projects an image onto the mirror 96 which in turn projects to the mirror 97 and this projects to an image-transmitting mirror 98 which in turn projects the image onto the main scanning mirror 59 within the housing 50.

The image-transmitting mirror 98 is mounted on a support 99 which moves on the guide 100 fixed to the housing 50 and is connected at 101 to the chain 102 which passes around sprockets 103 and 104 and is in turn connected to the chain 105 which is coupled at 106 to the chain 102 and is attached at the point 107 to the housing 86 so that this chain is anchored in relation to the frame 86.

The chain 105 passes around sprockets 108 and 109 which are supported by the member 110 which carries the mirrors 96 and 97 and it will be realised from this assembly that as the mirror 98 moves through a distance corresponding to the normal movement of the mirror 59, the mirrors 96 and 97 move through one half the distance because of the chain connection to maintain the light path at the correct length to ensure that the lens 85 focuses correctly onto the slit 79 and thus onto the drum 51 to apply the scan to the rotating drum 51.

Because of the long light path the necessary amplification of a microfiche or the like is given in association with a selected lens 85. As it is desirable to also move the lens 85 synchronously with the mirror 98 which transmits the image through the glass platen 58, a pin 112 on the member 110 engages a slot in an arm 114 pivoted to the frame 86 by the pin 115 and connected by means of a rod 116 to the mount of the lens 85 which moves in the guide 87, and in this way the small linear movement required during a scan by the lens 85 is achieved, the ratio depending on the distance of the connection 117 from the pivot pin 115. This synchronises with the linear scan produced on the photoconductor drum as it rotates.

In use, the device which is the basic photocopier as contained with the housing 50 can be used to scan any object placed onto the glass platen 58 but when it is desired to scan on the drum 51 a microfiche or other image from a member 88, the housing 86 is placed onto the housing 50 in correct register and the movement devices of the two machines interconnected by for instance a toothed wheel 120 on the sprocket 65 meshing with a toothed wheel 121 on the sprocket 104 to then cause the mirror 98 to move synchronously with the mirror 59 as it is driven by the copier and maintaining the two units in correct synchronized operation.

It will be realised that in the unit within the housing 86, the mirror movement, as in the case of the unit within the housing 50, will compensate for the distance of the mirror 98 from the mirror 95 through the mirrors 96 and 97 moving at half the speed of the mirror 98, but when a projection is made from a microfiche or other member 88, because the lens 85 is in use and the light source 90, the lens 80 within the main copier is swung out of position and the copier light source is extinguished so that there is an uninterrupted light path from the lens 85 to the drum 51 of a length necessary to give a scan of correct dimension on the drum 51 from a microfiche or other element.

The method of interconnecting the means which move the various mirrors can of course be varied but any form of indexing between the chain 63 and the chain 102 is suitable to maintain the necessary synchronization.

The machine shown is typical of what is found in photocopiers which use a rotating drum or a moving image-receiving member and the invention can be applied by appropriate design to any of these machines using the principle outlined above.

Thus it will be realised that in FIGS. 1 and 2 are shown attachments for modified copying machines, and it will also be realised the copying machines require only minor modification such as switching off the illumination source in the copier, and in the case of the machine described with reference to FIG. 1 the special control of the blind 18 which intercepts unwanted light in the photocopier when used in association with the attachment, and in the case of FIG. 2 the moving out of the way of the lens 80 to leave an uninterrupted light path between the lens 85 of the attachment and the image receiving drum, and also in the case of FIG. 2 it is necessary to provide a means of synchronizing the movement of the mirror 98 with the mirror 59 which can be achieved in various ways such for instance, as shown in FIG. 2, using gearing 120 and 121, but similarly each of the machines could depend on synchronous motor drives without having a mechanical interconnection and changes of this nature will depend on the machines to which the microfilm or microfiche copier is adapted.

The lenses 38 and 85 can have "zoom" facilities where required to ensure correct size of the projected image on the sensitised surface of the paper or drum, and this could compensate for different sizes of microfiche and microfilm or the like.

The unit shown in FIG. 3 comprises a photocopier having a transparent platen 130 beneath which is a single moving scanner mirror 131 driven along the platen 130 in any suitable manner and transmitting the light image to a fixed mirror 132 which transmits it to the drum 133 through a slit 134.

The drum has a similar charging station, developer station, transfer station, and cleaning station to the drum described with reference to FIG. 2, and includes a lens 135 which moves differentially with the scanning mirror 131 to maintain the correct image focus.

The adaptor in this case comprises a light source 136 and a lens 137 and between them a movable carrier 138 for the microfilm or microfiche, the lens 137 projecting the light image on to a fixed mirror 139 which transmits the image to a movable transmitting mirror 140 which is coupled to move synchronously with the scanning mirror 131 so that the light image from the mirror 140 is transmitted through the transparent platen 130 to the mirror 131.

When the adaptor unit is in place on the photocopier the lens 134 is moved out of the light beam between the mirrors 131 and 132 as the lens 137 is then in use, or the mirrors 131 and 132 are lowered out of line with the lens, and it will be realised that as the transmitting mirror 140 of the adaptor unit and the scanning mirror 131 of the photocopier move between the mirrors 132 and 139, the length of the light image projection path remains constant.

The carrier 138 is moved in synchronisation with the two mirrors 131 and 140 by any selected means which give the correct ratio of movement required between the carrier 138 and the length of movement of the mirrors 131 and 140.

If a visual scan is required a hinged mirror 142 is used which can be positioned as shown in the illustration or swung out of line as shown by the arrow, which mirror reflects the image to the mirrors 143 and 144 from which the image is reflected to the screen 145 at the correct focus.

We claim:

1. A microfilm or microfiche adaption unit for a photocopier machine, said machine normally including a light to illumine a transparent window and a lens to project an image from an object placed on the said window on to a charged photoconductive member to light modify the photoconductive member and to subsequently develop the image so produced on the photoconductive member said adaption unit comprising a housing adapted to engage the photocopier machine over the transparent window of the photocopier machine, a light source and a lens supported on said housing to project light through said window, a carrier for a microfilm or microfiche on said housing between said light source and said lens to project an image from the said microfilm or microfiche through said window, means to render the said light in the photocopier machine which illumines the said window ineffective, and means in the said photocopier machine to bypass the said lens within said photocopier machine to allow the said image from the microfilm or microfiche to be projected on to the photoconductive member in said photocopier machine and to subsequently develop the image so produced in the said photocopier machine.

2. An adaption unit according to claim 1 further characterised by a movable mirror in said adaption unit to alternatively project the said image on to a screen for viewing.

3. An adaption unit according to claim 1 wherein the photocopier is of the type which has a moving mirror and lens system which scans the said window through a slit in a blind which moves with the said slit, characterised in that the said blind is made detachable from the moving mirror and lens system to leave it remote of the mirror and lens system when the adaption unit is in place on the photocopier and thereby to allow the image projected through the said window to light-modify the said photoconductive member in the said photocopier, said blind being arranged to be re-engageable on said moving mirror and lens system when the said adaption unit is not in place, further characterised by means to de-energise the normal light system of the photocopier when the said adaption unit is in place on the said photocopier.

4. An adaption unit according to claim 1 wherein the photocopier is of the type which has a moving mirror system and a lens system which scans the said window and projects a light image on to a moving photoconductive member through a slit, characterised in that the said adaption unit includes a travelling image-transmitting mirror which is movable synchronously with a moving scanning mirror of the said photocopier and projects a light image from the image-transmitting moving mirror in the said adaption unit through the said window to the scanning mirror of the said photocopier, further characterised by means to synchronise the movement of the said mirrors, and further characterised in that the said lens system and the light system of the said photocopier is rendered inoperative when the said adaption unit is placed over the said window.

5. An adaption unit according to claim 4 wherein the lens system of the adaption unit is movable to scan the microfilm or microfiche, and the said movement is synchronised with the scan movement of the mirror system of the photocopier whereby the said microfilm is scanned linearly from side to side and the scanned image is projected on to the said moving photoconductor to progress linearly.

6. An adaption unit according to claim 4 or 5 wherein the said synchronisation is achieved by coupling the moving scanner mechanism of the photocopier directly to the moving scanner mechanism of the adaption unit to drive the adaption unit from the said photocopier.

7. An adaption unit according to claim 4 wherein the lens system of the adaption unit is movable to scan the microfilm or microfiche, characterised in that the adaption unit has a main moving image-transmitting mirror adjacent to the said window of the photocopier which is movable along the said window synchronously with the scanning mirror of the photocopier to transmit an image from the travelling mirror to the said scanning mirror, further characterised by a mirror at the lens of the adaption unit which receives a light image from the said lens and is movable with the lens and a secondary mirror system which transmits the image from the mirror at the lens to the said main moving mirror, both the mirror at the lens and the main mirror facing in the same direction, said secondary mirror being mounted on a guided support to move toward or away from the said mirrors at half the rate of the said main mirror to maintain the length of the said light path constant, and coupling means between the said secondary mirror support and the said lens system to move the lens system at a scan rate consistent with the rate of movement of the said photoconductive member.

8. An adaption unit according to claim 4 wherein the light image from the lens is projected on to a fixed mirror at one end of a transparent platen when the adaptor is positioned on the photocopier, and the photocopier has a fixed mirror on the opposite end of the said transparent platen, characterised by a transmitting mirror on the adaptor movable along the said platen, means to synchronise the said transmitting mirror with a scanning mirror on the said photocopier, whereby to transmit a light image from the said fixed mirror on the adaptor unit to the said transmitting mirror and thence through the said platen to the said scanning mirror and thence to the said fixed mirror on the said photocopier, further characterised by means to place the lens system of the photocopier out of the line of projection of the light image between the said scanning mirror and the said fixed mirror on the photocopier, and to de-energise the light source of the photocopier.

9. An adaption unit according to claim 8 further characterised by means to move the said microfilm or the said microfiche across the said lens of the adaptor unit to synchronise the movement of the said microfilm or microfiche with the movement of the said transmitting mirror.

* * * * *

UNITED STATES PATENT AND TRADEMARK OFFICE
CERTIFICATE OF CORRECTION

PATENT NO. : 4,170,412
DATED : October 9, 1979
INVENTOR(S) : Archie R. Grace and Robert J. Grace It is certified that error appears in the above-identified patent and that said Letters Patent are hereby corrected as shown below:

Column 1,   line 45, "slits can" should be --slit scan--;

Column 2,   line 4, "like or the" should be --like of the--;

Column 3,   line 63, "Referring not" should be --Referring now--.

Signed and Sealed this

Tenth Day of June 1980

[SEAL]

Attest:

SIDNEY A. DIAMOND

Attesting Officer      Commissioner of Patents and Trademarks